July 7, 1970  J. W. NELSON ET AL  3,519,789
WELDING METHOD
Filed Aug. 8, 1966  4 Sheets-Sheet 1
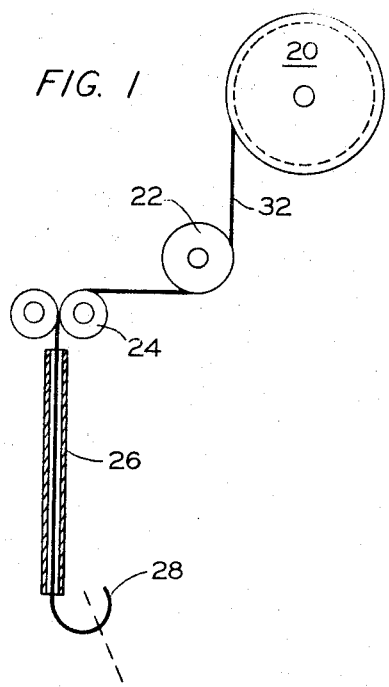
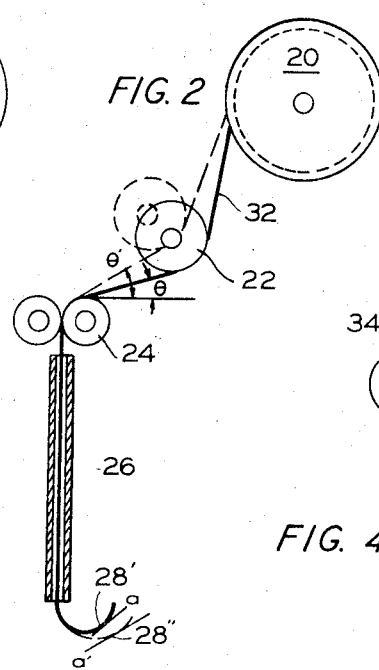
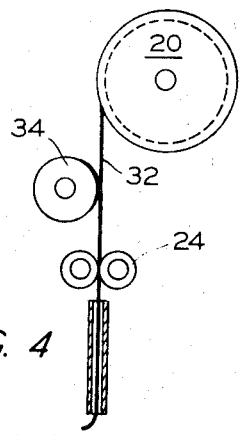
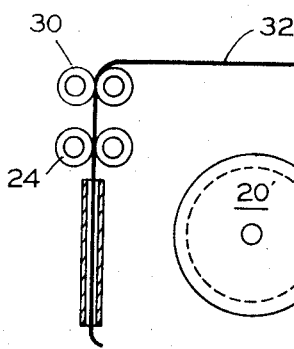
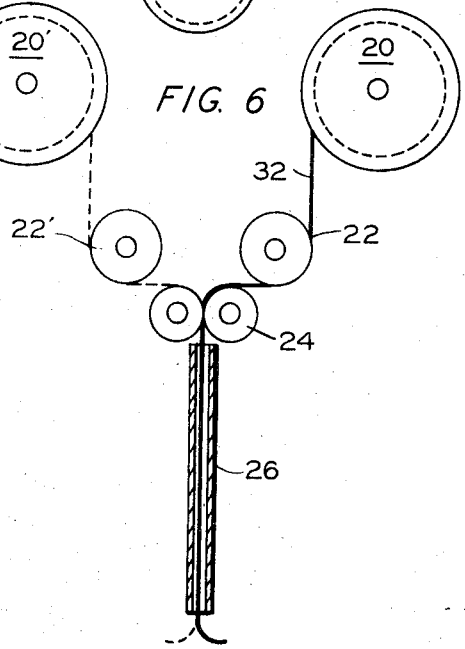
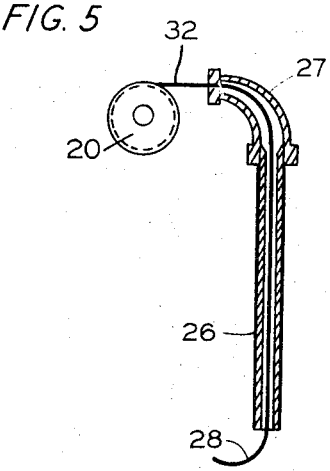
INVENTORS
JEROME W. NELSON
ROBERT E. POLLOCK &
ROBERT P. MEISTER July 7, 1970 J. W. NELSON ET AL 3,519,789
WELDING METHOD
Filed Aug. 8, 1966 4 Sheets-Sheet 2
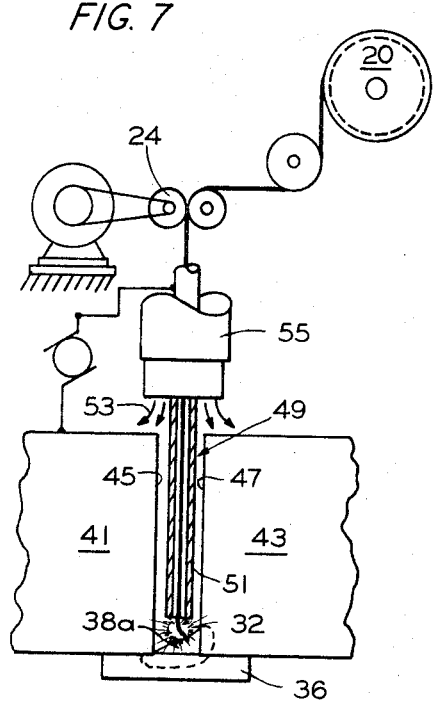
FIG. 7
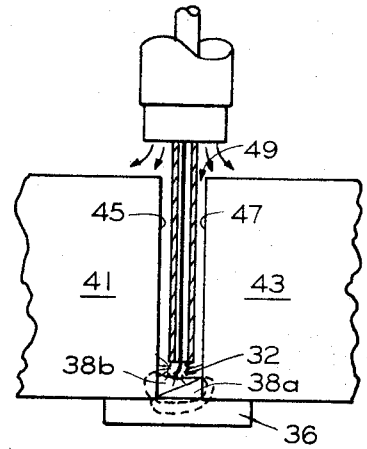
FIG. 8
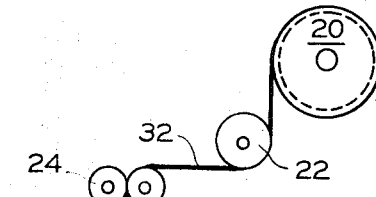
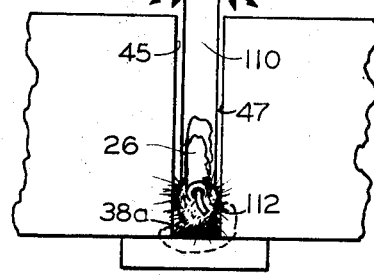
FIG. 11
INVENTORS
JEROME W. NELSON
ROBERT E. POLLOCK &
BY ROBERT P. MEISTER
Gray, Mase & Dunson
ATTORNEYS July 7, 1970  J. W. NELSON ET AL  3,519,789

WELDING METHOD

Filed Aug. 8, 1966  4 Sheets-Sheet 3

INVENTORS
JEROME W. NELSON
ROBERT E. POLLOCK &
ROBERT P. MEISTER

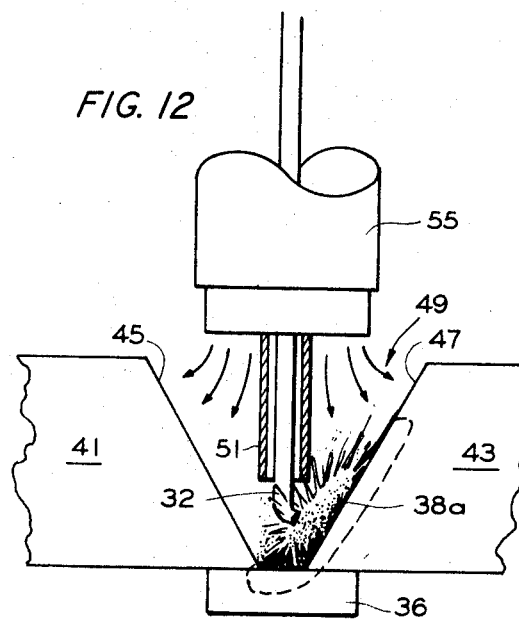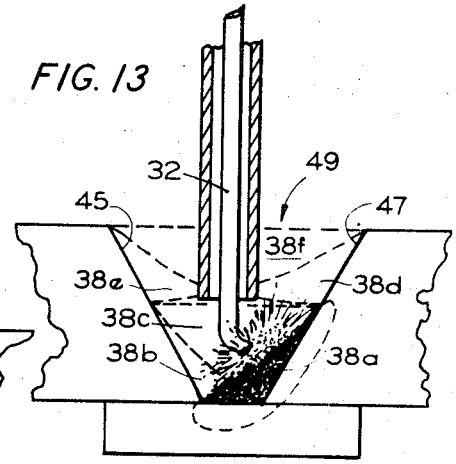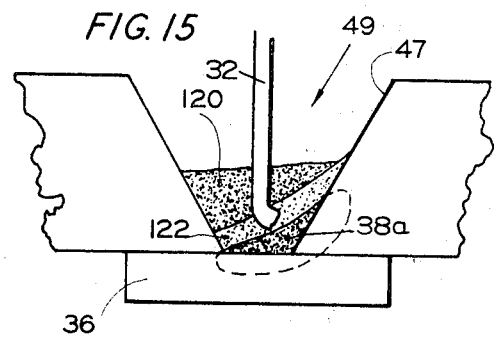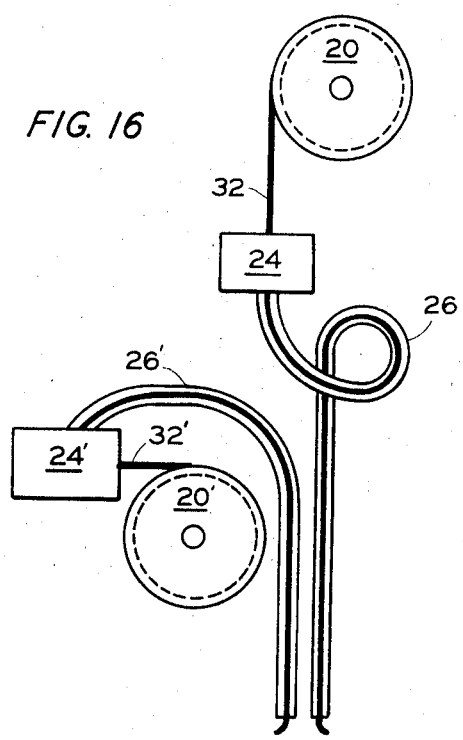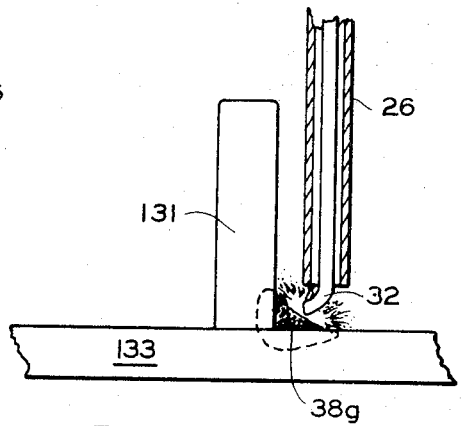

United States Patent Office

3,519,789
Patented July 7, 1970

3,519,789
WELDING METHOD
Jerome W. Nelson, Columbus, Robert E. Pollock, Hilliard, and Robert P. Meister, Columbus, Ohio, assignors to The Battelle Development Corporation, Columbus, Ohio, a corporation of Delaware
Filed Aug. 8, 1966, Ser. No. 570,868
Int. Cl. B23k 9/12
U.S. Cl. 219—130
16 Claims

ABSTRACT OF THE DISCLOSURE

A consumable welding wire, having a predetermined permanent curvature imparted thereto prior to entering the contact tube, is guided into a weld gap with the emerging arcuate end portion thereof directed toward one of the gap sidewalls.

---

This invention relates to consumable wire for welding and to a method and apparatus for consumable wire welding wherein a stable arc is maintained to produce a weld having uniformly sound adherence to the sidewalls of the members being welded.

In consumable wier welding, wire rod is fed continuously from a spool so as to emerge in the weld area to strike an arc with a workpiece or melt in a source of intense heat in the weld area. The wire rod melts off to deposit molten material in the weld area. Because the wire rod must be coiled, some set is introduced to the wire being fed and some lateral twisting motion is imparted thereto. By using large diameter coils (e.g., 15 inches) in consumable electrode welding, the small amount of set introduced thereby is sometimes adjusted with the length of a contact tube to provide electrical contact near the burn-off end of the wire and minimal heating of the wire. However, the set tends to be variable and the lateral twisting motion causes the end of the wire emerging in the area of the weld joint to face the members forming the weld joint at various angles and strike arcs with different portions of the weld joint. The lateral distance of the burn-off end of the wire from the sidewalls of the weld joint and the longitudinal distance from the base of the weld joint varies. When the emergent angle of the wire rod varies, the arc length tends to change and the arc moves up and down the walls. At one extreme, where the emergent angle points the wire end toward the sidewalls, gouging occurs. The sidewall opposite the gouged sidewall furnishes the other extreme by reason of inadequate fusion for lack of weld metal.

To compensate for movement of the burn-off end of the wire rod, excessive heat input can be used to assure flow of metal to the sidewalls and resultant adherence thereto. The excess heat requirement increases the power needed, enlarges the weld heat affected zone, and increases the likelihood of distortion. Often, straightening means such as drive rolls, special confining members, or the like are interposed between the source of the wire and the burn-off end to insure that straight wire emerges in the weld joint. Specially designed contact tubes are used therewith to insure the requisite electrical contact near the burn-off end of the wire. These devices cannot remove all of the set imparted to the wire by coiling and do not insure complete lack of movement because they are somewhat removed from the end of the wire emerging in the weld joint. Further, even where the strightness of wire can be controlled within reasonable limits by manipulation of other variables, sidewall adherence can be a problem in certain welding processes. For example, in welding with a consumable electrode in the submerged melt process, large power requirements are needed to furnish the heat required to flow to the walls of the weld joint or careful control of the position of the electrode is required. In the latter case, it is difficult to obtain adequate clearance for the welding equipment when one of the sidewalls forms a "blind side" as in welding a fixture to a larger body.

One consumable electrode process in which the aforesaid problems related to uncontrollable wire movement are noted particularly is the narrow-gap welding process for downhand welding and out-of-position welding as described in copending application Ser. No. 498,734, now U.S. Pat. 3,328,556, wherein relatively continuous welding is performed automatically or semi-automatically in a narrow groove opening. The aforesaid process is characterized by the use of low heat input operating with a consumable electrode in the spray transfer range to achieve optimum high mechanical properties and narrow heat affected zones. In the process described, uniformly adherent weld metal must be deposited to a substantial depth. Further, the close spacing of the sidewalls of the weld joint and the small bevel angles used can make the sidewall gouging problem more serious. Even with the close sidewall spacing, the electrode must travel in close proximity to the sidewall to insure fusion thereat. In addition to sidewall gouging, arcing with the sidewalls is an undesirable side effect of travel close to the sidewalls.

It is a feature of this invention that a welding electrode is provided that is capable of sustaining a stable arc in consumable electrode welding.

It is another feature of this invention that a welding electrode is provided for consumable electrode welding with reduced amounts of heat input.

It is still another feature of this invention that a welding electrode is provided for consumable electrode welding having a burn-off point spaced at a constant distance from the members forming the weld joint during a welding pass through the joint.

It is still another feature of this invention that a consumable electrode process is provided wherein a uniform depth of fusion is achieved to the sidewalls forming the weld joint.

It is yet another feature of this invention that a consumable electrode process is provided wherein the consumable electrode may travel at a convenient lateral distance from the sidewalls.

In its broadest aspects, the present invention relates to a consumable wire rod having a constant predetermined permanent set imparted thereto such that the end of an arcuate portion thereof always is directed toward a wall of one of the members forming the weld joint. As used herein the terms "set" and "cast" are used interchangeably and are meant to define the strain in a wire imparted thereto upon exceeding its elastic limit causing it to assume a configuration dictated by the amount of strain in the wire. Further, in referring to the wire as directed toward a sidewall, it is meant to define wire deflected away from its vertical axis but not necessarily directed at a sidewall. When the consumable wire of the invention is fed coaxially through a confining sleeve, it emerges from the base thereof at a predetermined constant arcuate angle. The invention further relates to feeding said electrode wire into a joint gap such that a stable arc is always directed toward the sidewall of the joint at a predetermined distance from the base of the joint.

In the drawings:

FIG. 1 is a plan view illustrating means for producing electrode wire having a predetermined arcuate portion.

FIG. 2 is a plan view similar to FIG. 1 demonstrating by solid and dashed lines the manner of adjusting the predetermined angle of the arcuate portion.

FIG. 3 is a plan view illustrating still different means for producing electrode wire having a predetermined arcuate portion.

FIG. 4 is a plan view illustrating another means for producing electrode wire having a predetermined arcuate portion.

FIG. 5 is a plan view illustrating still another means for producing electrode wire having a predetermined arcuate portion.

FIG. 6 is a plan view illustrating means for varying the predetermined angle of the arcuate portion of the electrode wire by 180°.

FIGS. 7 and 8 are plan views showing examples of welding by successive passes using alternately directed wire electrodes. FIG. 7 shows a first pass with a wire electrode directed at one sidewall, and FIG. 8 shows a second pass with a wire electrode directed at 180° to the wire electrode of FIG. 6.

FIG. 11 is a plan view with parts partially broken away showing the invention in connection with welding using the tungsten arc process.

FIG. 12 is a plan view showing the invention in connection with consumable electrode welding of V-joints.

FIG. 13 is a plan view showing the filling of the V-joint of FIG. 12 in accordance with the invention.

FIG. 14 is a plan view showing the invention in connection with the consumable electrode welding of T-joints.

FIG. 15 is a plan view showing the invention in connection with submerged melt welding.

FIG. 16 is a plan view illustrating an alternate method of producing a predetermined uniform angle in the arcuate portion of an electrode wire.

Figure 9:
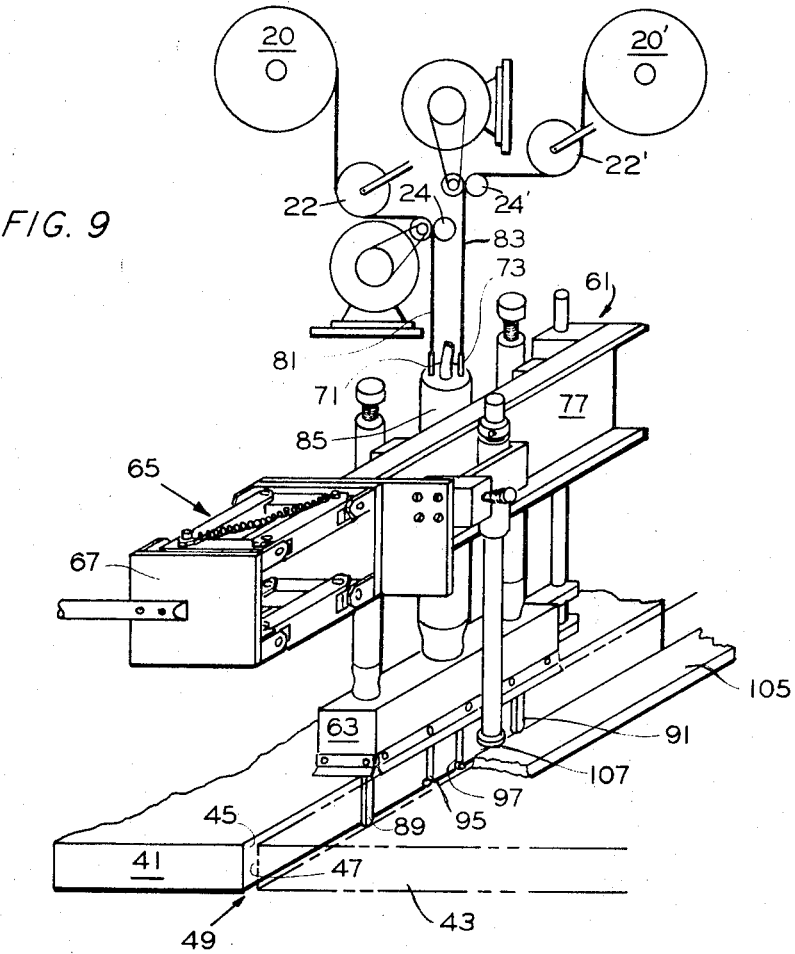
FIG. 9 is a perspective view of multiple wire welding apparatus with alternately directed electrodes according to the invention.

In the drawings, the same reference numerals are applied to identical parts in all embodiments and such identically numbered parts are substantially identical in structure, function, and operation. Therefore, to eliminate confusing duplication, these parts, their interrelationship and their function will be described only in conjunction with a single embodiment, such description applying to all embodiments where these parts appear.

In one embodiment of the invention a permanent set is imparted to the wire by feeding the wire to forming means at a predetermined angle such that wire having a uniform arcuate cast is available at the weld site. The predetermined angle should be such that wire allowed to coil at the weld site (e.g., without allowing the wire to strike the sidewalls or burn off by formation of an arc) has a potential coil diameter dictated by the forming means.

Referring to FIG. 1, the wire 32 coiled about a spool 20 is fed substantially perpendicular to an idler roll 22 and is fed therearound and directed at an angle of 90° to the drive rolls 24—24. To insure that the wire 32 is fed at about 90° to the drive rolls 24—24, the level of the base of the idler roll 22 is maintained about even with the top of the drive rolls 24—24. From the drive rolls 24—24, the wire 32 may be fed through tubing and suitable contact tubes or the like represented by a confining sleeve 26 of FIG. 1. The confining sleeve 26 serves to maintain straight alignment of the wire. For purposes of illustrating the principles involved in producing a permanent set according to an embodiment of the invention, the wire 32 of FIG. 1 is shown emerging from the sleeve 26 in a coil 28. The dashed line represents the approximate burn-off point during welding operations. The permanent set shown by the coil 28 is imparted by the drive rolls 24—24 while the idler roll 22 acts to properly direct the wire and insures a lack of spiraling.

In FIG. 2, solid and dashed lines are used to represent a manner of varying the permanent set of the wire 32 by varying the position of the idler roll 22 to adjust the angle at which the wire 32 enters the drive rolls 24—24. In the position represented by the solid line of FIG. 2, showing the wire 32 entering the drive rolls 24—24 at an angle $\theta$ the cast of the wire is such that the emergent arcuate angle $\alpha$ of coil 28' increases from that shown by coil 28 in FIG. 1. In the dashed representation of FIG. 2, the wire 32 enters the drive rolls at an angle $\theta'$ to further change the shape of the coil 28" and emergent angle $\alpha'$. For preferred welding wherein sidewall adherence is assured, the permanent set in the wire 32 should be such as to provide a diameter of coil 28 of from 4 to 10 inches, preferably of from 6 to 10 inches.

Referring to FIG. 3, the wire 32 enters the forming rolls 30—30 directly from a coil wound on spool 20 to have a permanent set imparted thereto and passes to the drive rolls 24—24. Because the amount of set is controlled by the diameter of the forming rolls 30—30, changes in the amount of set can be made merely by interchanging the forming rolls 30—30 without need for disturbing the drive rolls 24—24.

Referring to the embodiment of FIG. 4, wire 32 is wrapped around a single forming roll 34 having a diameter dictated by the amount of set desired in the wire and is fed by the drive rolls 24—24.

The nature of the forming equipment is seen to be dependent on the amount of cast desired in the wire, the properties of the wire and the diameter of the wire. The diameter of the wire can be of any size consistent with those used for consumable electrode welding and is limited only by the size of the forming equipment needed to impart a permanent cast. For given forming equipment, the principal wire properties that must be considered to provide the requisite sidewall adherence associated with said diameters of 4 to 10 inches are tensile strength and degree of cold work or stiffness of the wire. Wire that is too soft such as fully annealed wire will not take a permanent set, thereby tending to straighten out as it passes from the forming means through a confining sleeve. Wire that is too hard will not take any consistent degree of permanent set in the forming equipment.

In another embodiment of the invention, wire wound about a spool has a predetermined set selected to provide the desired arcuate contour dicttaed by the diameter of the spool and those properties of the wire described previously in connection with forming. This eliminates the need for forming equipment as shown in connection with FIGS. 1 to 4 wherein large spools or wire having a random set are used.

Referring to FIG. 5, the wire 32 from a spool 20 having wire previously wrapped there around to achieve a permanent constant set is fed directly substantially perpendicular to the vertical axis of the confining sleeve 26. A guide 27 affixed to the entrance end of the confining sleeve 26 insures proper alignment of the wire 32 into the confining sleeve 26.

Welding can be done using a single wire having a permanent set imparted thereto or using a number of wires thus formed. Thus, various combinations of forming means such as combinations of those shown in FIGS. 1 to 5 may be used with multiple wires.

Referring to FIG. 6, a wire 32 is fed to 90° to drive rolls 24—24 in the manner of FIG. 1. To change the angle of the arcuate portion of the wire 32 emerging from the confining sleeve 26 by 180°, slack is taken in the electrode wire 32 at the idler pulley 22 and the spool 20 is rotated 180° about a vertical axis to feed wire around idler pulley 22'.

Although the invention is capable of a variety of expressions, an embodiment theerof will be described particularly in connection with the narrow gap welding process as in FIGS. 7 and 8 wherein two plates 41 and 43 are aligned to form a narrow gap having sides 45 and 47.

Referring to FIG. 7, a contact tube 51 and emergent were electrode 32 fed from spool 20 in the manner described in FIG. 1 are immersed in the gap 49. The permanent cast imparted to the wire electrode by the drive rolls 24—24 causes the burn-off end of thee mergent wire electrode 32 to face the sidewall 47. Shielding gas (represented by the arrows 53) flows down into the gap 49 of the joint from the telescopic concentric gas-shielding tube 55 positioned thereabove.

Following insertion of the contact tube 51 in the joint, electrical power is furnished from the power source and a first welding pass is made in gap 49. Molten metal 38a begins to deposit against the sidewall 47 and flows downwardly to fuse gainst the back-up plate 36 as the contact tube 51 travels along the joint formed by the gap 49. Wire electrode 32 is fed continuously as the contact tube 51 travels along the gap 49 of the weld joint and emerges therefrom at a constant angle throughout the pass. Upon completion of the pass a layer of the metal 38a is provided adherent to the sidewalls 47 at a uniform depth and adherent across the surface of the back-up plate 36. Only a minor proportion of the weld metal is adherent to the opposing sidewall 45.

Referring to FIG. 8 a second pass is made using the wire 32 with a cast directed at about 180° to the cast shown for the electrode 32 in FIG. 7. During the pass, the wire 32 deposits metal 38b on the surface of the weld metal 38a deposited in the pass of FIG. 7. Following completion of the pass, a pair of oppositely tapered wedge-shaped metal layers 38a and 38b is stacked one on top of the other to form a rectanugular-shaped deposit firmly adherent to the sidewalls 45 and 47.

The remainder of the welding passes are made with alternate passes each having oppositely directed emergent wire electrode portions to fill the gap 49 of the weld joint.

Figure 10:
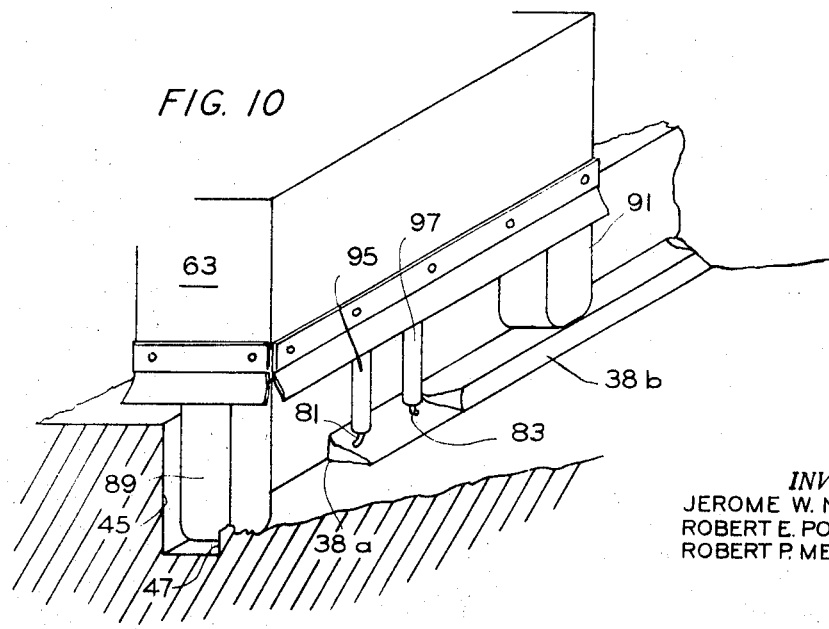
FIG. 10 is a sectional view through a joint showing enlarged detail of multiple wire welding in an apparatus similar to that of FIG. 8.

Referring to FIGS. 9 and 10, wire electrodes comprising lead wire 81 and trail wire 83 fed from the spools 20 and 20', respectively, are directed into the drive rolls 24—24 and 24'—24' at an angle of 90° thereto and at an angle of 180° with respect to another. The electrode wires 81 and 83 pass from the drive rolls 24–24 and 24'—24' to the guide tubes 71 and 73 connected to a barrel 85 affixed to a frame 77 of a floating welding head 61 supporting the guides 89 and 91 and responsive to a parallelogram mount 65 to emerge from the contact tubes 95 and 97 at the base of the barrel 85. Lead wire 81 emerges from a contact tube 95 having an arcuate portion at 180° to the arcuate portion of trail wire 83 emerging from contact tube 97. A shielding gas cup 63 mounted to a float with respect to the head 61 confines an inert atmosphere in the weld zone. The welding head 61 is positioned laterally with respect to the joint by the bar 105 that serves as a guide for a roller 107.

In operation, the carriage (not shown) attached to the plate 67 guides the welding head 61 through the gap 49 by means of the roller 107 and guide bar 105 and the guides 89 and 91. The weld metal 38a deposited from the lead wire 81 fuses to a uniform depth along the sidewall 45 and flows uniformly downwardly along the base of the joint toward the opposing sidewall 47. The weld metal 38b from the trial wire 123 fuses to the sidewall 47 to a uniform depth about even with the depth of the weld metal 38a at the sidewall 45. Molten weld metal flows slightly to fill the wedge shaped cavity formed between the sidewall 47 and the weld metal 38a. This leaves a substantially uniform depth of weld metal from the sidewall 45 to the sidewall 47 permanentaly adherent thereto. Subsequent passes in the manner described provide a filed weld joint.

In a typical narrow gap welding operation using a single electrode wire as in FIG. 7 or 8, the following wire properties are found suitable to enable the wire to receive a permanent set according to the invention:

Tensile strength, p.s.i. _____ 125–130,000
Cold work, percent _____ 18–30
Initial coil diameter, in. _____ 15–30
Max, helix diameter, in. _____ 4
Diameter _____ 0.035

In FIG. 11, the invention is shown in connection with narrow gap welding using a tungsten electrode 110. The wire 32 is fed continuously from a spool 20 to pass around the idler roll 22 and has a permanent set imparted thereto by drive rolls 24—24 from which the wire 32 passes through the guide tubes 26 to ultimately emerge directly in the arc 112. Upon escaping the confinement of the guide tube 26, the wire 32 assumes an arcuate angle in the arc to direct the weld metal 38 at the sidewall. Subsequent passes are made with wires each alternately directed as described in connection with FIGS. 7 and 8.

Referring to FIGS. 12, 13, 14, and 15 consumable electrode welding of V-joints and T-joints are shown according to the invention. In FIG. 12, suitable forming equipment (not shown) is used to impart a permanent set to the electrode wire 32 emerging from a contact tube 51 provided with a telescopic gas shield 55. The weld metal 38a is deposited against the sidewall 47 from the arcuate portion of electrode 32 to flow across the base plate 36. Subsequent passes are made using the wire 32, each pass having alternately directed arcuate portions serving to fill the gap 49 of the weld joint.

In FIG. 13, the weld metal 38a is deposited against the sidewall 47 of a V-joint forming joint 49 from the wire electrode 32. Weld metal deposited during subsequent passes is represented by the weld zones 38b through 38f. The weld metal 38b is deposited against the sidewall 45 by directing the arcuate portion of the wire 32 at 180° to the direction used for depositing the weld metal 38a. This can be done as described in connection with FIG. 6. For the weld metal 38c the wire 32 is removed from the forming equipment and weld metal is deposited in the conventional manner to fill the cavity formed between the surface of weld metal 38a and 38b. The sequence of steps described for welds 38a, 38b, and 38c is repeated for weld metal at 38d, 38e, and 38f.

From FIG. 13, it will be appreciated that any sequence of passes can be made to produce weld metal of varying geometry. For welding V-joints, adjustment of forming equipment compensates for changes in the size of the weld joint as it becomes filled. Similarly, any number of electrodes passing through various combinations of separate forming equipment or combinations where one electrode may not pass through forming equipment may be used. In any event, a joint characterized by uniformly sound sidewall adherence is obtained.

Referring to FIG. 14, consumable welding of T-joints is shown according to the invention whereby wire 32 having a permanent set imparted thereto by means not shown travels along the T-joint formed by members 131 and 133 to deposit weld metal 38 uniformly adherent to the vertical member 131 and the horizontal base 133. Because burn-off occurs at the end of the arcuate portion of the wire 32, the end is close to the vertical member 131 whereas the straight portion of the wire 32 is confined in confining sleeve 26 in a plane further laterally removed from the vertical member 131 than the point at which the burn-off end is located.

In FIG. 15, an embodiment of the invention is shown in connection with submerged melt welding of V-joints. The electrode wire 32 having a permanent set imparted thereto according to the invention is continuously fed through granular flux 120 as it travels along the gap 49 formed by the weld joint. The heat available at the end of the arcuate portion of the electrode 32 causes a molten slag layer 122 to form from the flux 120 through which metal from the electrode 32 flows to deposit against the sidewall 47 and the base plate 36. Subsequent passes as previously described are made to fill the weld joint. Because weld metal is deposited directly against the sidewalls, the large amount of heat needed to flow metal from conventional relatively straight electrodes to the sidewalls is reduced.

Referring to FIG. 16, for an alternate method of producing a permanent set or cast particularly applicable to two-wire system, wire electrodes 32 and 32' enter the forming equipment 24 from the spools 20 and 20'. The wire is formed to have a permanent set or cast imparted thereto and is fed through confining sleeves 26 and 26' to conform to the set produced from the forming equipment 24 and properly orient the wires 32 and 32'. The confining sleeves 26 and 26' are essentially the same as the conventional confining sleeves or contact tubes shown in the other figures with the exception that the entrance end of the sleeves has been extended and formed to guide the permanent set of the wire electrodes passing therethrough toward one of the gap sidewalls. As shown, the guide tube 26' to the wire 32' curves approximately 90° in directing the wire 32' so that as the wire 32' comes out of the confining sleeve 26' it will be directed into the sidewall of the joint. The confining sleeve 26 for the wire 32 is looped 270 degrees to orientate the wire-cast direction opposite to that of the wire 32' so that the wire 32 comes out of the confining sleeve 26 toward the opposite sidewall.

In addition to improved economy and weld quality, this invention offers many other advantages. The arc is more stable and tends to stay at the bottom of the joint. If the arc tends to move up the sidewall, the arc length becomes greater because the electrode wire moves away from the sidewall. The increased arc length requires an increased arc voltage to sustain the new position. The constant-potential type power supply cannot supply the necessary increase arc voltage. The burn-off rate of the wire decreases and the arc moves back down to its normal position in the joint. This increased arc stability greatly reduces the chance of lack of fusion in the weld due to arc movement and also eliminates arc gouges in the sidewall which can cause difficulties in subsequent weld passes.

The invention allows for more clearance for welding equipment when welding against a blind sidewall or in welding T-joints. Further, the occurrence of sidewall arcing is minimized in these situations.

In making V-joints by means of consumable electrode welding, the invention provides considerable advantage by its ability to reduce the input of heat to the weld area. Because of reduced heat input and the ability to provide metal directly at the sidewalls, the included angle of the V can be decreased. This reduces the amount of weld metal that is needed in the weld joint as well as distortion of the metal members. The reduced heat input also provides economies in processes such as submerged melt welding by reducing the power requirements needed to assure sidewall adherence and reducing the size of the heat affected zone.

Numerous other uses and advantages of this invention will be apparent. For example, the invention may be used in connection with other welding processes such as plasma, gas, or laser and in any variety of weld joints in gap or out of gap. It will be understood that various changes in the details, materials, steps, and arrangements of parts, which have been herein described and illustrated in order to explain the nature of the invention may be made within the principles and scope of the invention.

What is claimed is:

1. A method of welding metal members comprising the steps of:
   (a) aligning said metal members to form a gap;
   (b) continuously feeding at least one consumable welding wire from a source of wire through a contact tube, said wire having a permanent set imparted thereto prior to entering the contact tube;
   (c) guiding said wire prior to entering the contact tube to orient said permanent set at a predetermined angle toward one of the gap sidewalls;
   (d) guiding said wire into said gap with the wire emerging from the contact tube at substantially said predetermined angle toward one of the gap sidewalls, the emerging portion of said wire having an arcuate shape determined by said permanent set; and
   (e) melting said emerging portion of said wire to deposit weld metal in said gap.

2. A method of welding metal members as in claim 1 wherein said source of wire is a spool having wire wound therabout, said wire having a permanent predetermined set.

3. A method of welding metal members as in claim 1 wherein said wire is directed from said source of wire to forming means to impart a permanent set thereto.

4. The method of claim 3 wherein said wire is directed to forming means comprising drive rolls at an angle determined by the desired permanent set.

5. The method of claim 3 wherein said wire is directed to forming means comprising forming rolls having a diameter determined by the desired permanent set.

6. The method of claim 3 wherein said wire is fed 360° about forming means comprising a single forming roll having a diameter determined by the desired permanent set.

7. A method of welding metal members as in claim 1 wherein said wire has a permanent set imparted thereto to provide a wire coil diameter of about 4 to 10 inches.

8. A method of welding metal members as in claim 1 wherein said wire is connected to a power source to strike an arc between said emerging portion of said wire and one of said metal members.

9. A method of welding metal members as in claim 1 wherein the emerging portion of said wire is fed directly into a source of intense heat to melt and deposit weld metal in said gap.

10. The method of claim 9 wherein said source of intense heat is the arc formed between a tungsten electrode and one of said metal members.

11. In the method of consumable electrode narrow gap welding wherein a consumable wire welding electrode connected to a source of power is continuously guided through a contact tube and into a narrow gap formed between metal members to deposit metal from said consumable wire electrode in said gap by striking an arc with said metal members, the improvement comprising imparting a permanent set to said consumable wire prior to passing said wire through said contact tube and guiding said wire prior to entering the contact tube to orient the permanent set toward one of the gap sidewalls at a predetermined angle.

12. The method of claim 11 wherein said consumable wire electrode has a permanent set imparted thereto to provide a wire coil diameter of about 4 to 10 inches.

13. A method of welding metal members comprising the steps of:
   (a) aligning said metal members to form a gap;
   (b) continuously feeding at least one pair of consumable welding wires from a source of wire through at least one pair of contact tubes, each said wire having a permanent set imparted thereto prior to entering the contact tube;
   (c) guiding said wires prior to entering the contact tubes to orient said permanent sets at predetermined angles toward the opposite ones of the gap sidewalls;
   (d) guiding each said wire into said gap with the wires emerging from the contact tube at substantially said predetermined angles toward the gap sidewalls, the emerging portion of each said wire having an arcuate shape determined by said permanent set, and the emreging portions of the wires of said pair being directed to opposing sides of said gap; and
   (e) melting said emerging portions of said wire to deposit weld metal in said gap.

14. The method of claim 3, wherein the contact tube includes an extension thereof at the entrance end of said contact tube, said extension being formed to guide said permanent set toward one of the gap sidewalls.

15. The method of claim 1, wherein said wire is guided toward one of the gap sidewalls by an idler roll positioned between said contact tube and said source of wire.

16. The method of claim 1, wherein the emerging portion of said wire is directed into a granular flux within the gap and said flux is melted to form a molten slag layer through which weld metal flows as it is deposited.

References Cited

UNITED STATES PATENTS

| | | | |
|---|---|---|---|
| 3,084,246 | 4/1963 | Rieppel et al. | 219—60 X |
| 3,088,018 | 4/1963 | Ross et al. | 219—60 |
| 2,302,781 | 11/1942 | La Force | 219—130 |
| 2,778,099 | 1/1957 | Anderson et al. | 219—130 X |
| 3,123,702 | 3/1964 | Keidel et al. | 219—130 X |
| 3,328,556 | 6/1967 | Nelson et al. | 219—125 X |
| 3,374,335 | 3/1968 | Reesor et al. | 219—137 X |

JOSEPH V. TRUHE, Primary Examiner

J. G. SMITH, Assistant Examiner

U.S. Cl. X.R.

219—137